United States Patent
Beall et al.

(10) Patent No.: US 6,284,693 B1
(45) Date of Patent: Sep. 4, 2001

(54) FABRICATION OF ULTRA LOW THERMAL EXPANSION CORDIERITE STRUCTURES

(75) Inventors: Douglas M. Beall, Painted Post; Gregory A. Merkel, Big Flats, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/451,309

(22) Filed: Nov. 30, 1999

Related U.S. Application Data

(60) Provisional application No. 60/111,192, filed on Dec. 7, 1998.

(51) Int. Cl.[7] .............................. C04B 35/195; B32B 3/12
(52) U.S. Cl. .......................... 501/119; 501/120; 501/128; 501/153; 501/154; 428/116
(58) Field of Search ................................... 501/119, 120, 501/128, 153, 154; 428/116

(56) References Cited

U.S. PATENT DOCUMENTS

| | | |
|---|---|---|
| 3,885,977 | 5/1975 | Lachman et al. . |
| 4,316,965 | 2/1982 | Oda et al. . |
| 4,434,117 | 2/1984 | Inoguchi et al. . |
| 4,745,092 | 5/1988 | Prunier, Jr. . |
| 4,772,580 | 9/1988 | Hamanaka et al. . |
| 4,810,681 | 3/1989 | Hayakawa . |
| 4,869,944 | 9/1989 | Harada et al. . |
| 4,877,670 | 10/1989 | Hamanaka . |
| 4,950,628 | 8/1990 | Landon et al. . |
| 5,030,398 | 7/1991 | Hamanaka et al. . |
| 5,114,643 | 5/1992 | Beall et al. . |
| 5,114,644 | 5/1992 | Beall et al. . |
| 5,141,686 | 8/1992 | Murtagh . |
| 5,258,150 | 11/1993 | Merkel et al. . |
| 5,270,270 | 12/1993 | Semar et al. . |
| 5,281,462 | 1/1994 | Day et al. . |
| 5,332,703 | 7/1994 | Hickman . |
| 5,409,870 | 4/1995 | Locker et al. . |
| 6,004,501 * | 12/1999 | Cornelius et al. .................... 264/631 |

* cited by examiner

*Primary Examiner*—David R Sample
(74) *Attorney, Agent, or Firm*—Timothy M. Schaeberle; Anca C. Gheorghiu

(57) ABSTRACT

Disclosed is sintered ceramic article that exhibits a primary crystalline phase of cordierite and analytical oxide composition, in weight percent, of 49–53% $SiO_2$, 33–38% $Al_2O_3$, 12–16% MgO and exhibits a coefficient of thermal expansion no greater than about $4.0\times10^{-7}/°$ C. over the temperature range of about 25° C. to about 800° C. and a transverse-I ratio of not less than about 0.92. Also disclosed is a method for producing a sintered cordierite ceramic article involving preparing a plasticizable raw material, comprising a magnesium source, a $SiO_2$-forming source and an additional component of either: (a) a clay-free, $Al_2O_3$-forming source having a surface area of greater than about 5 $m^2$/g; or, (b) a clay and $Al_2O_3$-forming source combination wherein the clay comprises no greater than about 30%, by weight, of the total inorganic mixture, and the $Al_2O_3$-forming source exhibits a surface area of greater than about 40 $m^2$/g. The mixture is formed into a green body substrate of the desired configuration and subsequently dried and fired for a time and at temperature sufficient to form a structure having the aforementioned CTE and I-ratio properties.

6 Claims, 1 Drawing Sheet

○ = Comparative examples 8–11, 13, 14
△ = Inventive examples 1–7.

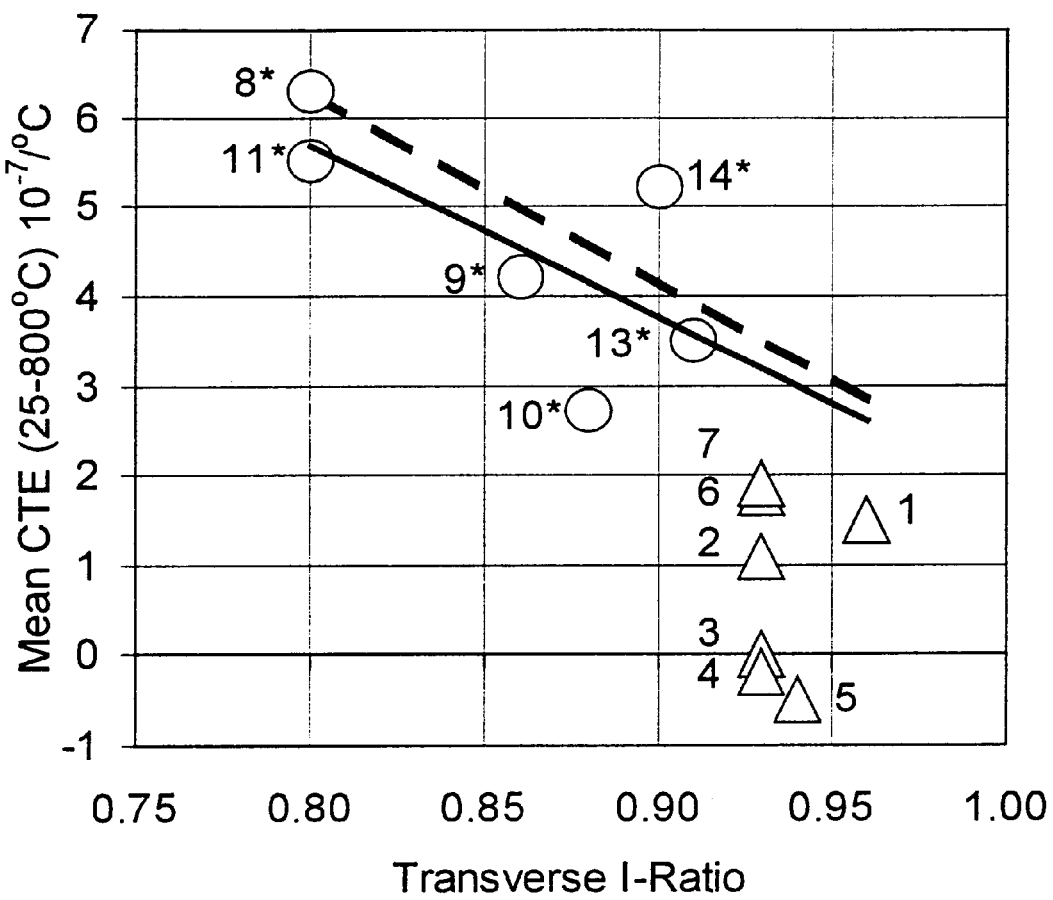

FABRICATION OF ULTRA LOW THERMAL EXPANSION CORDIERITE STRUCTURES

This application claims the benefit of U.S. Provisional Application No. 60/111,192, filed Dec. 7, 1998, entitled "Fabrication of Ultra Low Thermal Expansion Cordierite Structures", by Beall et al.

BACKGROUND OF THE INVENTION

1. Field of the Invention

The invention relates to cordierite ceramic bodies for use as catalyst carriers, particularly to cordierite bodies, having an ultra low thermal expansion, for use as catalyst carriers for purifying automobile exhaust gas, and a method for producing the cordierite structures.

2. Discussion of the Related Art

The exhaust gases emitted by internal combustion systems utilizing hydrocarbon fuels, such as hydrocarbon gases, gasoline or diesel fuel, can cause serious pollution of the atmosphere. Among the many pollutants in these exhaust gases are hydrocarbons and oxygen-containing compounds, the latter including nitrogen oxides (NOx) and carbon monoxide (CO). The automotive industry has for many years attempted to reduce the quantities of pollutants from automobile engine systems, the first automobiles equipped with catalytic converters having been introduced in the mid 1970's.

Cordierite substrates, typically in the form of a honeycomb body, have long been preferred for use as substrates to support catalytically active components for catalytic converters on automobiles, in part due to cordierite ceramics' high thermal shock resistance. The thermal shock resistance is inversely proportional to the coefficient of thermal expansion. That is, honeycombs with a low thermal expansion have a good thermal shock resistance and can survive the wide temperature fluctuations that are encountered in the application. It is generally known that the coefficient of thermal expansion of cordierite bodies is about $18 \times 10^{-7}/°C$. in the range of 25° C.–800° C. for those polycrystalline cordierite bodies in which the cordierite crystals are randomly oriented.

The production of cordierite ($2MgO \cdot 2Al_2O_3 \cdot 5SiO_2$) ceramics from mineral batches containing sources of magnesium, aluminum and silicon such as clay and talc is well known. Such a process is described in U.S. Pat. No. 2,684,919. U.S. Pat. No. 3,885,977 discloses the manufacture of thermal-shock-resistant cordierite honeycomb ceramics from clay/talc batches by extruding the batches and firing the extrudate to provide ceramics with very low expansion coefficients along at least one direction. Furthermore, this reference describes the principle of orienting the cordierite crystals with their crystallographic c-axis in the plane of the honeycomb webs, resulting in thermal expansion values as low as $5.5 \times 10^{-7}/°C$.

Manufacturers work continuously to optimize the characteristics of cordierite substrates to enhance their utility as catalyst carriers. Specifically, manufacturers continually strive to optimize the thermal shock resistance and strength of the cordierite substrates. The following patents each relate to the manufacture of ceramic honeycombs exhibiting improved thermal shock resistance or coefficient of thermal expansion (CTE).

U.S. Pat. No. 4,434,117 (Inoguchi et al.) discloses the use of a raw material mixture comprising plate-shaped talc particles and non-plate shaped particles of other ceramic materials and thereafter anisostatically forming the mixed batch so as to impart a planar orientation to the plate-shaped talc particles and then drying and firing to obtain a formed ceramic body. The ceramic bodies formed in the Inoguchi reference exhibited thermal expansion coefficients as low as $7.0 \times 10^{-7}/°C$.

U.S. Pat. Nos. 5,144,643 (Beall et al.) and 5,144,643 (Beall et al.) disclose a method of fabricating a cordierite body involving selecting specific raw materials that will form the desired cordierite body. Specifically, these raw material selections should not include any clay or talc, should include a MgO-yielding component and an $Al_2O_3$-yielding component having a particle size of no greater than 15 and 8 $\mu m$, respectively. The raw materials are mixed together, subsequently dried and fired for a time and a temperature sufficient to form the aforementioned cordierite body. The ceramic bodies formed by these Beall references exhibited thermal expansion coefficients of less than about $9 \times 10^{-7}/°C$. from about 25 to about 1000° C.

Lastly, U.S. Pat. No. 5,258,150 (Merkel et al.) discloses a method of forming a cordierite body involving a raw material batch mixture comprising certain selected raw materials including platy talc, 0 to 48% of a platelet-type or delaminated clay and an aluminum oxide-yielding component having an average particle size of between 3 to 8 $\mu m$, or less than 3 $\mu m$. The method involves mixing the raw materials with a binder system and extruding the mixture to form a green body and thereafter firing the green body at a temperature of at least 1390° C. to result in a sintered cordierite body. The ceramic bodies formed by this Merkel reference exhibited thermal expansion coefficients of less than about $4 \times 10^{-7}/°C$. from about 25 to about 1000° C., a porosity greater than about 42% and a median pore diameter of between about 5 to 40 $\mu m$; however, these bodies are disclosed therein as exhibiting I-ratios of no greater than about 0.91.

While such ceramics represent an improvement in the thermal expansion coefficient properties over extruded cordierite ceramics produced using pre-existing processes, still further improvements in this thermal expansion characteristic, particularly without a measurable reduction in the ceramics' strength would be desirable. Strength has become an increasingly important consideration in the production of cordierite honeycomb substrates as a result of the move to producing thinner-walled, higher cell density, increased catalytic conversion efficiency and lower back pressure cordierite honeycomb catalyst carriers.

It is therefore a principal object of the present invention to provide improved cordierite ceramics, and method for making them, that exhibit adequate strength in combination with an ultra-low thermal expansion.

SUMMARY OF THE INVENTION

The present invention provides for a sintered ceramic substrate and method for making the ceramic substrate, having a primary crystalline phase comprising cordierite and exhibiting an ultra-low coefficient of thermal expansion and a higher than expected strength.

Specifically, the sintered ceramic article of the invention exhibits a primary crystalline phase of cordierite and analytical oxide composition, in weight percent, of 49–53% $SiO_2$, 33–38% $Al_2O_3$, 12–16% MgO and exhibits a coefficient of thermal expansion in at least one direction no greater than about $4.0 \times 10^{-7}/°C$. over the temperature range of about 25° C. to about 800° C. and a transverse-I ratio of not less than about about 0.92.

This invention also relates to a method for producing a sintered cordierite ceramic article involving preparing a plasticizable raw material mixture, comprising a magnesium source, a $SiO_2$-forming source and an additional component of either: (a) a clay-free, $Al_2O_3$-forming source having a surface area of greater than about 5 $m^2/g$; or, (b) a clay and $Al_2O_3$-forming source combination wherein the clay comprises no greater than about 30%, by weight, of the total inorganic mixture, and the $Al_2O_3$-forming source exhibits a surface area of greater than about 40 $m^2/g$. The magnesium source comprises a platy talc having a morphology index of greater than about 0.75. The $Al_2O_3$-forming source having a surface area of greater than about 5 $m^2/g$ preferably comprises a reactive alumina or aluminum hydroxide having an median particle diameter of no greater than about 1 $\mu m$, while the $Al_2O_3$-forming source having a surface area of greater than about 40 $m^2/g$ preferably comprises "transition" aluminas or aluminum oxyhydroxide having a median particle diameter of no greater than about 1 $\mu m$, where median particle diameters are measured by a particle size analyzer employing the sedimentation technique. The mixture is thereafter formed into a green body substrate of the desired configuration and subsequently dried and fired for a time and at temperature sufficient to form a structure having the aforementioned CTE and I-ratio properties.

BRIEF DESCRIPTION OF THE DRAWINGS

FIG. 1 is a graphical illustration comparing the CTE v. I-ratio relationship of the inventive and comparative examples.

DETAILED DESCRIPTION OF THE INVENTION

The present invention relates to ceramic articles exhibiting a primary crystalline phase of cordierite and to a method of producing these articles using a selected combination of either low clay or clay-free raw materials including specified sources of aluminum, magnesium and silicon. Specifically, the inventive ceramic articles are formed from a plasticizable batch mixture comprised of raw materials and the relative amounts of each selected to form the sintered ceramic article consisting essentially, on an analytical oxide basis, of about, by weight, 49–53% $SiO_2$, 33–38% $Al_2O_3$, 12–16% MgO.

As previously mentioned, it has been found that by utilizing the specific magnesium yielding and alumina-forming raw materials in the batch mixture, the mixture described herein results in sintered ceramic articles, characterized by a primary crystalline phase of cordierite, having a property combination of an ultra-low coefficient of thermal expansion (CTE) and a high transverse I-ratio. Specifically, a CTE of less than about $4.0 \times 10^{-7}/°$ C. at 25° C. to 800° C. and a transverse I-ratio of not less than about 0.92 characterize the ceramic bodies of the present invention. Preferably, the CTE exhibited by the inventive cordierite bodies is no greater than about $3.0 \times 10^{-7}/°$ C. at 25° C. to 800° C. The cordierite ceramic bodies are further characterized by a relatively high strength, given the low CTE, of at least about 2400 psi.

In accordance with the present invention, provided is a plasticizable mixture for use in preparing the ceramic article above with the mixture comprising a $SiO_2$-forming source, a magnesium source comprising a platy talc having a morphology index greater than about 0.75 and one of the following additional components: (a) a clay-free, $Al_2O_3$-forming source having a surface area of greater than about 5 $m^2/g$; or, (b) a combination of clay and an $Al_2O_3$-forming source, wherein the clay comprises no greater than about 30%, by weight of the total inorganic mixture, and the $Al_2O_3$-forming source exhibits a surface area of greater than about 40 $m^2/g$.

The silica forming source comprises silica raw materials including fused $SiO_2$; colloidal silica; crystalline silica, such as quartz or cristobalite, or a low-alumina substantially alkali-free zeolite. Additionally, the silica-forming source can comprise a compound that forms free silica, when heated, for example, silicic acid or a silicon organometallic compound.

The $Al_2O_3$-forming source, for the purposes of the instant invention is a compound which, when heated, forms $Al_2O_3$. Regarding the 5 $m^2/g$ or greater $Al_2O_3$ source, that material is selected from the group consisting of alumina, aluminum hydroxide, aluminum oxyhydroxide, and combinations thereof. A particularly preferred source comprises a highly reactive α-alumina or aluminum hydroxide having a median particle diameter of about one $\mu m$ micron or less. Regarding the $Al_2O_3$ forming materials having a surface area greater than 40 $m^2/g$, that material includes a compound selected from the group consisting of "transition" or activated aluminas, such as gamma alumina, and aluminum oxyhydroxide, wherein the median particle size of the alumina source is no greater than about 1 $\mu m$; preferably this source comprises boehmite or pseudoboehmite.

Clay as used herein means either calcined or raw clay, the clay preferably comprising a kaolin.

The magnesium source comprises a platy talc, that is a talc that exhibits a platelet particle morphology, that is, particles having two long dimensions and one short dimension, or, a length and width of the platelet that is much larger than its thickness. It is preferred that the talc possess a morphology index greater than about 0.75. The morphology index (refer to U.S. Pat. No. 5,141,686) is a measure of the degree of platiness of the talc. One typical procedure for measuring the morphology index is to place the sample in a holder so that the orientation of the platy talc is maximized within the plane of the sample holder. The x-ray diffraction pattern is then determined for this oriented talc. The morphology index semi-quantitatively relates the platy character of the talc to its XRD peak intensities using the following equation:

$$M = \frac{I_x}{I_x + 2I_y}$$

where $I_x$ is the intensity of the (004) peak and $I_y$ is that of the (020) reflection.

The aforementioned raw materials of which the plasticized mixture is comprised are combined in a mixing step sufficient to produce an intimate mixing of the raw material phases to allow complete reaction in thermal processing. A binder system is added at this point to help create an extrudable mixture that is formable and moldable. A preferred binder system for use in the present invention comprises a cellulose ether binder component selected from the group consisting of methylcellulose, methylcellulose derivatives, and combinations thereof, a surfactant component, preferably stearic acid or sodium stearate, and a solvent comprising water. Excellent results have been obtained utilizing a binder system which comprises the following amounts, assuming 100 parts by weight of the inorganic, alumina and silica forming sources and talc, raw material mixture: about 0.2 to 2 parts by weight of the sodium stearate, about 2.5 to 6.0 parts by weight of a methylcellulose or a hydroxypropyl methylcellulose binder, and about 20–50 parts by weight of the water.

The individual components of the binder system are mixed with a mass of the inorganic powder material, e.g., the talc, alumina and silica forming sources mixture, in a suitable known manner, to prepare an intimate mixture of the ceramic material and the binder system capable of being formed into a ceramic body by, for example, extrusion. For example, all components of the binder system may be previously mixed with each other, and the mixture is added to the ceramic powder material. In this case, the entire portion of the binder system may be added at one time, or divided portions of the binder system may be added one after another at suitable intervals. Alternatively, the components of binder system may be added to the ceramic material one after another, or each previously prepared mixture of two or more components of the binder system may be added to the ceramic powder material. Further, the binder system may be first mixed with a portion of the ceramic powder material. In this case, the remaining portion of the ceramic powder is subsequently added to the prepared mixture. In any case, the binder system must be uniformly mixed with the ceramic powder material in a predetermined portion. Uniform mixing of the binder system and the ceramic powder material may be accomplished in a known kneading process.

The resulting stiff, uniform and extrudable batch mixture is then shaped into a green body by any known conventional ceramic forming process, such as, e.g. extrusion, injection molding, slip casting, centrifugal casting, pressure casting, dry pressing, etc. For the preparation of a thin-walled honeycomb substrate suitable for use as a catalyst support, extrusion through a die is preferable.

The prepared ceramic green body is then dried for a period of about 5–20 minutes prior to firing by any conventional method such as either hot-air or dielectric drying. The dried green body is thereafter fired at a sufficient temperature for a sufficient time to result in a fired ceramic body containing cordierite as its primary phase. The firing conditions can vary depending on the process conditions such as specific composition, size of the green body, and nature of the equipment. However, some preferred firing conditions are as follows:

Heating the green body to a temperature of between about 1380° C. to about 1450° C. holding at this temperature for about 6 hours to about 16 hours, and thereafter cooling the green body to room temperature.

As described above the cordierite ceramic bodies, when formed as a honeycomb structure for example, by extrusion, are further characterized by their preferred orientation of the cordierite crystallites as evidenced by their characteristic high transverse and low axial I-ratios. Specifically, a transverse I-ratio of not less than about 0.92, and an axial I-ratio of less than about 0.41 characterize the cordierite bodies of the present invention.

This I-ratio characteristic is measured through the use of an x-ray diffraction analysis of a section of the fired web of a cordierite honeycomb body. If the negative expansion c-axes of the crystallites comprising cordierite body are preferentially oriented in a particular direction, then the (00l) reflections measured from a slice cut normal to that direction should be more intense than if the crystallites were randomly oriented. At the same time, (hk0) reflections that are diffracted from crystallographic planes parallel to the negative expansion c-axes (and perpendicular to the 00l planes) should be less intense than when there is no preferred orientation. The following ratio, the I-ratio ($I_R$), as first described in U.S. Pat. No. 3,885,977, is used to describe the degree of preferred orientation:

$$I_R = \frac{I_{(110)}}{I_{(110)} + I_{(002)}}$$

where $I_{(110)}$ and $I_{(002)}$ are the peak heights of the X-ray reflections from the (110) and (002) crystallographic planes respectively, based on hexagonal cordierite crystal structure; these reflections correspond to d-spacings of about 4.9 and 4.68Å, respectively.

The axial and transverse I-ratio refer to different orientations of a cordierite honeycomb sample in the x-ray beam. The x-ray beam impinges a planar surface at an angle. Referring specifically to the measurement of the transverse I-ratio, this measurement is taken on the planar surface of the sample when that planar surface on which the x-rays impinge is the flat surface made up of the as-formed wall surfaces of the honeycomb. Put differently, this measurement of the transverse I-ratio is performed by slicing the cordierite honeycomb substrate to expose a flat section of a web of the honeycomb and subjecting this web to X-ray diffraction and calculating the intensity of the observed diffraction peaks. If the obtained value is greater than 0.65, which is the I-ratio for a body of completely randomly oriented crystals (i.e., a powder), then it can be inferred that the cordierite crystallites have a preferred orientation; i.e., a majority of the cordierite crystallites are oriented with their c-axes in the plane of the web. An I-ratio of 1.00 would imply that all of the cordierite crystallites were oriented with their negative expansion axis within the plane of the web, and thus the closer the transverse I-ratio ($I_T$) is to a value of 1.00, the higher the degree of this planar orientation. Referring specifically now to the measurement of the axial I ratio, this measurement is taken on a plane which is perpendicular to the length of the cell channels (and, therefore, also perpendicular to that for a transverse I-ratio) where the planar surface on which the x-rays impinge consists of the cross-sectional ends of the honeycomb webs. Put differently, this X-ray measurement is performed on the surface of the cordierite honeycomb that is normal to the direction of extrusion. If the axial I-ratio ($I_A$) is less than 0.65 it can again be inferred that the cordierite crystallites exhibit a preferred orientation. Specifically, since the cordierite crystallites are preferentially oriented with their c-axes in the plane of the webs, the intensity of the reflections from the (002) planes is expected to be greater than that for a body with completely randomly oriented cordierite crystallites.

Simply stated, if the I-ratio measured in the transverse direction with respect to the extrusion direction of the body exceeds about 0.65 or the axial I-ratio with respect to the extrusion direction is less than about 0.65, then the cordierite crystallites are becoming substantially oriented with their c-axes within plane of the webs.

It is well established that the coefficient of thermal expansion of cordierite cellular bodies in the axial direction (parallel to the cell channels) is affected by non-random crystallographic orientation of the cordierite crystals in the microstructure, by the degree of microcracking present in the body after firing, and by the presence of high-expansion extraneous phases. Typically, higher values of transverse I-ratio, and correspondingly lower values of axial I-ratio correlate with low values of thermal expansion measured axially. Essentially, this is due to the combined effect of the negative expansion direction of the cordierite crystallites being oriented in the plane of the webs coupled with the generation of microcracks forming from strains associated with thermal expansion anisotropy of large regions of oriented crystallites.

As indicated previously, a primary utility of the mixtures described herein is for preparing high strength cordierite honeycomb substrates useful as catalyst carriers. Although the invention is particularly advantageous for preparing thin-walled honeycombs, the claimed mixtures can also be used for thicker walled structures. Methods of applying catalysts to the honeycomb structures, and utilizing those structures, for example, in automobile exhaust systems, are well known in the art. The mixtures may also be useful for preparing other high strength cordierite structures, such as filters.

EXAMPLES

To further illustrate the principles of the present invention, there will be described several examples of the ceramic bodies formed according to the invention, as well as several comparison examples. However, it is to be understood that the examples are given for illustrative purpose only, and the invention is not limited thereto, but various modifications and changes may be made in the invention, without departing from the spirit of the invention.

Examples 1–14

Inorganic powder batch mixtures, as listed in percent by weight, suitable for the formation of a ceramic body having cordierite as its primary crystalline phase are listed in Table I; Examples 1–7 inventive, 8–14 comparison. Each of compositions 1–14 was prepared by combining and dry mixing together the components of the designated inorganic mixture as listed in Table I. To these mixtures was added the amount of the organic binder system listed in Table I and this intermediate mixture was thereafter further mixed with deionized water to form a plasticized ceramic batch mixture. The binder system components, as detailed in Table I are listed in parts by weight, based on 100 parts total inorganics.

Table II reports various properties of the commercially available raw materials utilized in Examples, specifically those properties discussed as being important in the formation of the low CTE, high I-ratio cordierite examples. Included in the table are the following important raw material characteristic properties: morphology index, the surface area ($m^2/g$) as measured by the B.E.T. method and average particle diameter ($\mu m$) as measured by the sedimentation technique.

Each of the various plasticized mixtures was extruded through an extruder under conditions suitable to form ¼ in. (6.35 mm) rods, as well as conditions suitable to form 4 in. (101.6 mm) long, 400 cell/in² (62 cells/cm²) honeycomb substrates having a 1.0 in. (25.4 mm) diameter and 8 mils (0.20 mm) thick cell walls. The green ceramic rods and honeycombs formed from each of the 14 batch compositions were sufficiently dried to remove any water or liquid phases that might be present and thereafter subjected to a heating and firing cycle sufficient to remove the organic binder system from, and to sinter, the extruded rods and honeycombs. Specifically, the green bodies of each type of substrate were fired to between 1405 and 1430° C. and held for a period of about 10 hours; i.e., firing conditions suitable for forming ceramic bodies having cordierite as their primary phase.

Table I additionally reports selected properties for the ceramics produced from the batches reported in the Table. Properties included for each of the ceramic bodies are the modulus of rupture strength (MOR) of the rods measured by four-point loading, in psi, except for Example 5; the average coefficient of thermal expansion (CTE) of the ceramic rod over the temperature range from about 25° C. to 800° C.($\times 10^{-7}/°$ C.) as measured by dilatometry; and the volume percent open porosity and median pore diameter in $\mu m$, as measured by Hg porosimetry. Furthermore, Table I includes the transverse I-ratio, $I_T$, and, for some examples, the axial I-ratios, $I_A$, each as measured in the manner as described above.

TABLE I

|  | 1 | 2 | 3 | 4 | 5 | 6 | 7 | 8* | 9* |
|---|---|---|---|---|---|---|---|---|---|
| INORGANICS |
| Talc 1 | — | — | — | — | — | — | — | 40.78 | 40.86 |
| Talc 2 | — | 42.29 | 41.92 | 39.88 | 39.88 | — | 40.13 | — | — |
| Talc 3 | 42.29 | — | — | — | — | 42.29 | — | — | — |
| Calcined Clay | — | — | — | — | — | — | 15.71 | 26.48 | 32.60 |
| Raw Clay | — | — | — | — | — | — | 9.12 | 15.37 | 12.82 |
| Coarse α-alumina | — | — | — | — | — | — | — | 15.35 | — |
| Fine α-alumina | 34.20 | 34.20 | 28.94 | — | — | 34.20 | — | — | 13.72 |
| Boehmite | — | — | 5.83 | 37.94 | 37.94 | — | 25.46 | — | — |
| Silica 1 | 23.52 | 23.52 | 23.31 | 22.18 | 16.60 | — | — | 2.03 | — |
| Silica 2 -- colloidal silica solution** | — | — | — | — | 5.55 | — | 9.59 | — | — |
| Silica 3 -- fused | — | — | — | — | — | 23.5 | — | — | — |
| ORGANIC BINDER SYSTEM |
| Methylcellulose | 4.0 | 4.0 | 4.0 | 2.7 | 4.0 | 3.0 | 4.0 | 4.0 | 4.0 |
| Stearic Acid | 1.0 | 1.0 | 1.0 | 0.6 | 1.0 | 0.6 | 1.0 | 1.0 | 1.0 |
| Water | 28.0 | 31.0 | 32.0 | 38.0 | 38.0 | 28.0 | 40.0 | 30.0 | 30.0 |
| OXIDE PERCENT |
| $SiO_2$ | 51.35 | 51.35 | 51.50 | 52.42 | 52.41 | 51.34 | 52.07 | 51.45 | 51.42 |
| $Al_2O_3$ | 34.90 | 34.90 | 34.70 | 33.53 | 33.54 | 34.90 | 33.99 | 35.00 | 35.05 |
| MgO | 13.76 | 13.76 | 13.80 | 14.05 | 14.05 | 13.76 | 13.95 | 13.55 | 13.53 |

TABLE I-continued

| PROPERTIES | | | | | | | | | |
|---|---|---|---|---|---|---|---|---|---|
| CTE ($10^{-7}/°$ C.) | 1.5 | 1.1 | 0.0 | −0.2 | −0.5 | 1.8 | 1.9 | 6.3 | 4.2 |
| $I_T$ | 0.96 | 0.93 | 0.93 | 0.93 | 0.94 | 0.93 | 0.93 | 0.80 | 0.86 |
| $I_A$ | 0.34 | — | — | — | — | 0.37 | — | 0.50 | 0.44 |
| % Open Porosity | 33.0 | 33.7 | 33.6 | 21.0 | 19.8 | 32.7 | 14.3 | 36.0 | 28.5 |
| Median Pore size | 2.2 | 2.7 | 2.4 | 2.7 | 2.7 | 2.5 | 2.5 | 3.3 | 3.1 |
| MOR (psi) | 2900 | 2600 | 2600 | 2400 | — | 2800 | 4000 | 2500 | 3300 |

| | 10* | 11* | 12* | 13* | 14* |
|---|---|---|---|---|---|
| INORGANICS | | | | | |
| Talc 1 | 42.29 | — | — | — | — |
| Talc 2 | — | — | — | — | — |
| Talc 3 | — | — | 42.29 | 41.14 | 42.29 |
| Calcined Clay | — | — | — | — | 20.0 |
| Raw Clay | — | — | — | 19.46 | — |
| Calcined MgO | — | 13.7 | — | — | — |
| Coarse α-alumina | — | — | 34.20 | — | — |
| Fine α-alumina | 34.20 | 34.90 | — | 25.57 | 25.01 |
| Silica 1 | 23.52 | 51.40 | 23.52 | 13.83 | 12.71 |
| ORGANIC BINDER SYSTEM | | | | | |
| Methylcellulose | 4.0 | 2.73 | 4.0 | 4.0 | 4.03 |
| Stearic Acid | 1.0 | 0.6 | 1.0 | 1.0 | 1.0 |
| Water | 27.0 | 23.0 | 29.0 | 29.0 | 32.0 |
| OXIDE PERCENT | | | | | |
| $SiO_2$ | 51.35 | 51.40 | 51.35 | 51.36 | 51.36 |
| $Al_2O_3$ | 34.90 | 34.90 | 34.90 | 34.88 | 34.89 |
| MgO | 13.76 | 13.70 | 13.76 | 13.76 | 13.76 |
| PROPERTIES | | | | | |
| CTE ($10^{-7}/°$ C.) | 2.7 | 5.5 | 12.4 | 3.5 | 5.2 |
| $I_T$ | 0.88 | 0.80 | 0.88 | 0.91 | 0.90 |
| $I_A$ | 0.39 | — | 0.42 | 0.39 | 0.42 |
| % Open Porosity | 28.2 | 29.6 | 43.6 | 34.1 | 35.6 |
| Mean Pore size (μm) | 4.1 | 2.6 | 7.2 | 2.2 | 2.0 |
| MOR (psi) | 2800 | 2900 | 2700 | 3300 | 3200 |

*Comparative Examples
**Colloidal silica - In Example 5, 13.9 parts by weight of a colloidal silica solution were used, which contributed 5.55 parts by weight silica and 8.3 parts by weight water; this water is included in the total 38.0 parts by weight water used in this batch. In Example 7, 24.0 parts by weight of a colloidal silica solution were used, which contributed 9.59 parts by weight silica and 14.4 parts by weight water; this water is included in the 40 parts by weight water used in the batch.

TABLE II

| | MORPHOLOGY INDEX | MEDIAN PARTICLE DIAMETER (μm) | SURFACE AREA ($m^2/g$) |
|---|---|---|---|
| Talc 1 | 0.75 | 8.0 | |
| Talc 2 | 0.95 | 1.6 | |
| Talc 3 | 0.95 | 3.4 | |
| Calcined Clay | | 1.6 | |
| Raw Clay | | 0.8 | |
| Calcined MgO | | 0.8 | |
| Coarse α-alumina | | 4.5 | ~1.0 |
| Fine α-alumina | | 0.3 | 9.4 |
| Boehmite | | 0.1 | 180 |

An examination of the results of Table I reveals that composition Examples 1–7 represent cordierite ceramic bodies according to the present invention each of which exhibits an ultra-low thermal expansion of less than about $2.0 \times 10^{-7}/°$ C.(−0.5 to $1.9 \times 10^{-7}/°$ C.). Furthermore, it should be noted that all of the inventive examples exhibit a transverse I-ratio ($I_T$) of not less than 0.92, specifically ranging from 0.93 to 0.96 indicating a very high degree of preferred cordierite orientation with the crystal c-axes preferentially oriented within the plane of the cell walls of the ceramic honeycomb. This high degree of orientation, not previously reported in the prior art, is attributed to the novel combination of the highly platy nature of the talc raw materials, the high surface area of the alumina-yielding raw material and the low clay contents used in these examples. It should be noted, Examples 3, 4 and 5 demonstrate that the use of an aluminum oxyhydroxide raw material, specifically boehmite, produces cordierite bodies exhibiting CTE's of $0 \times 10^{-7}/°$ C. or less and I-ratios of at least 0.93.

While not intending to be limited by theory, it is thought that the very low CTE's of the present inventive bodies are due not only to an increase in the degree of preferred planar orientation of the cordierite crystallites, but also to an increased degree of microcracking. Before the increase in microcracking can be proved, it is first necessary to establish the relationship between the CTE, as measured parallel to the channels of the honeycomb body, and the transverse I-ratio. This requires definition of the relationship between CTE and crystal orientation, and between crystal orientation and I-ratio.

It is well known that cordierite exhibits different coefficients of thermal expansion along its three crystallographic axes. Specifically, the mean CTEs from 25° to 800° C. for orthorhombic cordierite have been reported to be $31.9 \times 10^{-7}/°$ C. along the a-axis, $25.9 \times 10^{-7}/°$ C. along the b-axis, and $-14.5 \times 10^{-7}/°$ C. along the c-axis (Derek Taylor, 1988, Thermal Expansion Data XIII. Complex oxides with chain, ring and layer structures and the apatites, Br. Cer. Trans. & Jour., vol. 87, no. 3, pp. 88–95, Table 3).

From the foregoing discussion of the cordierite I-ratio as measured by x-ray diffractometry, if all of the cordierite crystals are oriented with their c-axes perpendicular to the plane of the wall of honeycomb channels, the transverse I-ratio will be found to be equal to zero. This condition is referred to as complete reversed orientation. Also, because the c-axes of all of the crystals are orthogonal to the axial direction of the honeycomb along which the CTE is measured, then only the a-axis and b-axis CTEs will contribute to the axial CTE. Thus, assuming a cordierite ceramic body with no microcracking, the axial CTE of a cordierite honeycomb body with completely reverse-oriented cordierite crystals will be equal to the average of the a-axis and b-axis expansions, CTE(a,b), which is computed to be $(31.9 \times 10^{-7}/°$ C. $+ 25.9 \times 10^{-7}/°$ C.$)/2 = 28.9 \times 10^{-7}/°$ C.

Next, one considers the case in which all of the cordierite crystals are oriented with their c-axes within the plane of the honeycomb walls, but in which the c-axes have a net random orientation within that plane. This condition is referred to as complete planar orientation. The transverse I-ratio for such a body would be equal to 1.0. The CTE along the axial direction of such a body, exclusive of microcracking, will have a value that is the average of the c-axis CTE and the mean of the a-axis and b-axis expansions (CTE(a,b)), which is calculated to be $(-14.5 \times 10^{-7}/°$ C. $+ 28.9 \times 10^{-7}/°$ C.$)/2 = 7.2 \times 10^{-7}/°$ C.

From this analysis, it can be concluded that the rate at which CTE decreases due to an increase in the preferred, planar orientation of the cordierite, and with no change in microcracking or amount of extraneous phases, is equal to the difference in axial CTE for complete planar and complete reverse orientation, divided by the difference in transverse I-ratio for these two end-member conditions. This rate of change is thus computed to be $(7.2 \times 10^{-7}/°$ C. $- 28.9 \times 10^{-7}/°$ C.$)/(1.0-0.0) = -21.7 \times 10/°$ C.$^{-1}$ per unit change in I-ratio.

Referring now to FIG. 1, the CTE values of the inventive and comparative examples, except for Example 12, from Table I are plotted against their respective transverse I-ratios. The solid black line is a least-squares fit to the data for the comparative examples. The dashed line represents the decrease in CTE, relative to comparative Example 8, that would occur for an increase in degree of crystal orientation with no change in microcracking. A comparison of the data for the inventive examples reveals that their thermal expansions are lower than would be predicted based upon the trend of the data for the comparative examples, as represented by the solid line. The data also illustrate that the CTEs of inventive examples are $1.3 \times 10^{-7}/°$ C. to $3.8 \times 10^{-7}/°$ C. lower than would be predicted by only an increase in the planar orientation of the cordierite crystallites relative to the comparative examples. This difference demonstrates that the unexpectedly low CTEs of the inventive bodies are due not only to improved crystal orientation, but also to an increase in the degree of microcracking, which further lowers thermal expansion.

Although, the resultant ultra-low CTE is due to an increase in the particle orientation (i.e., high I-ratio) and a corresponding increase in the microcracking, it is worth noting that the strength of the inventive cordierite ceramic bodies remains acceptably high. Specifically, the inventive examples exhibit strength values of no less than about 2400 psi (2400 to 4000 psi), which is a strength expected for cordierite bodies having a 2 to 3 times greater CTE.

Referring now to the comparative examples, all of the comparison examples, Examples 8–14 exhibit a thermal expansion of greater than $2.0 \times 10^{-7}/°$ C.(2.6 to $12.4 \times 10^{-7}/°$ C.) and a transverse I-ratio ($I_T$) of 0.91 or less, 0.80 to 0.91. This lowered degree of orientation demonstrates that the use of clay without a sufficiently high surface area alumina source and/or talc having an insufficient degree of platiness results in ceramic bodies having a coefficient of thermal expansion and an I-ratio outside the scope of the invention.

Comparative Examples 8 and 9, representative of standard commercially available cordierite ceramics, specifically demonstrate that the use of a clay raw material component and a talc having an insufficient degree of platiness results in the formation of cordierite bodies having a decreased degree of orientation, as evidenced by I-ratios of 0.80 and 0.86, respectively, and thus a CTE of greater than $2.0 \times 10^{-7}/°$ C.

Comparative Example 10 demonstrates that the use of a talc exhibiting an insufficient degree of platiness, a morphology index of 0.75, even in combination with an $Al_2O_3$-forming source having the requisite surface area of greater than 5 m$^2$/g for a clay-free batch mixture, produces a cordierite body that exhibits a less than desirable degree of orientation, I-ratio of 0.88, and thus a cordierite body exhibiting an increased CTE, $2.7 \times 10^{-7}/°$ C. Comparative Example 12 demonstrates that the use of an alumina raw material comprising coarse alumina, even though used in combination with a talc having a platy morphology, results in the formation of a cordierite ceramic body which exhibits both an I-ratio and a CTE, 0.88 and $12.4 \times 10^{-7}/°$ C., respectively, outside the scope of the invention.

Comparative Examples 13 and 14 demonstrate that the use of a clay in the batch mixture, kaolin or calcined kaolin, in combination with the use of an $Al_2O_3$ forming source having less than the requisite surface area of greater than 40 m$^2$/g for clay containing batches, even in combination with a sufficiently platy talc, yields cordierite ceramic bodies having properties that lie outside the scope of the present invention.

It should be understood that while the present invention has been described in detail with respect to certain illustrative and specific embodiments thereof, it should not be considered limited to such, as numerous modifications are possible without departing from the broad spirit and scope of the present invention as defined in the appended claims.

We claim:

1. A ceramic article having sintered phase composition, by weight, comprising at least about 93% cordierite, consisting essentially of about, by weight, 49–53% $SiO_2$, 33–38% $Al_2O_3$, 12–16% MgO and which exhibits a coefficient of thermal expansion in at least one direction no greater than about $4.0 \times 10^{-7}/°$ C. over the temperature range of about 25° C. to about 800° C. and a transverse I-ratio of not less than 0.92.

2. A ceramic article in accordance with claim 1 which exhibits a coefficient of thermal expansion no greater than about $3.0 \times 10^{-7}/°$ C. over the temperature range of about 25° C. to about 800° C.

3. A ceramic article in accordance with claim 1 that exhibits a transverse I-ratio of at least 0.93.

4. A ceramic article in accordance with claim 1 which further exhibits an axial I-ratio of less than 0.41.

5. A ceramic article in accordance with claim 1 wherein the ceramic article comprises a honeycomb configuration.

6. A ceramic article in accordance with claim 1 wherein the article exhibits a porosity greater than about 15%.

* * * * *